(12) United States Patent
Spicer et al.

(10) Patent No.: US 9,440,359 B2
(45) Date of Patent: Sep. 13, 2016

(54) CONFORMABLE DRY ADHESIVE HOLDING DEVICE

(71) Applicant: GM GLOBAL TECHNOLOGY OPERATIONS LLC, Detroit, MI (US)

(72) Inventors: John Patrick Spicer, Plymouth, MI (US); Jianying Shi, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/728,294

(22) Filed: Jun. 2, 2015

(65) Prior Publication Data

US 2016/0052144 A1    Feb. 25, 2016

Related U.S. Application Data

(60) Provisional application No. 62/038,990, filed on Aug. 19, 2014.

(51) Int. Cl.
*B66C 1/42* (2006.01)
*B25J 15/00* (2006.01)

(52) U.S. Cl.
CPC ........... *B25J 15/0052* (2013.01); *B25J 15/008* (2013.01)

(58) Field of Classification Search
CPC ............................. B25J 15/0052; B25J 15/008
USPC ............................. 294/185, 86.4, 212, 119.3
See application file for complete search history.

(56) References Cited

U.S. PATENT DOCUMENTS

| | | | | |
|---|---|---|---|---|
| 7,785,422 B2 * | 8/2010 | Autumn | ................ | B08B 7/0028 134/32 |
| 7,921,858 B2 * | 4/2011 | Autumn | ................ | B08B 7/0028 134/137 |
| 8,485,576 B2 * | 7/2013 | Melville | ............... | B25J 15/0608 294/213 |
| 2008/0289757 A1 * | 11/2008 | Xie | ........................... | C09J 9/00 156/311 |
| 2012/0076629 A1 * | 3/2012 | Goff | ....................... | B25J 9/1612 414/730 |
| 2013/0106127 A1 | 5/2013 | Lipson et al. | | |
| 2014/0104744 A1 | 4/2014 | Prahlad et al. | | |
| 2015/0174768 A1 * | 6/2015 | Rodnick | ................ | H01L 21/677 414/744.2 |
| 2015/0336271 A1 * | 11/2015 | Spicer | ..................... | B23K 31/12 428/195.1 |

FOREIGN PATENT DOCUMENTS

DE    102014205988 A1 *  10/2015  .......... B25J 15/0085

* cited by examiner

*Primary Examiner* — Gabriela Puig
(74) *Attorney, Agent, or Firm* — Quinn Law Group, PLLC

(57) ABSTRACT

A gripping device is described and includes a holder including a base and a conformable jamming element that has a conformable releasable surface-adhesive element secured onto its surface.

15 Claims, 2 Drawing Sheets

CONFORMABLE DRY ADHESIVE HOLDING DEVICE

CROSS-REFERENCE TO RELATED APPLICATIONS

This application claims the benefit of U.S. Provisional Application No. 62/038,990, filed Aug. 19, 2014, which is hereby incorporated by reference in its entirety.

TECHNICAL FIELD

This disclosure relates to workpiece-gripping devices for fixtures, tooling, material handling and robotic end-effectors.

BACKGROUND

Universal grippers for tooling, fixtures and robotic end-effectors advantageously employ holding devices that attach to a variety of arbitrarily-shaped workpieces for movement and placement during manufacturing and assembly processes. Universal grippers may employ some form of external power to effect gripping and release, including vacuum-based suction grippers and anthropomorphic, multi-digit grippers for grasping and manipulating workpieces.

Passive universal grippers require minimal grasp planning and include components that passively conform to unique workpiece geometries, giving them the ability to grip widely varying workpieces without readjustment. Passive universal grippers may be simple to use and may require minimal visual preprocessing of their environment. However, an ability to grip many different workpieces often renders passive universal grippers inferior at gripping any one workpiece in particular.

One passive, universal jamming gripper employs granular materials contained in a pliable membrane that conforms to a surface of a workpiece by applying a jamming force. Such operation exploits temperature-independent fluid-like characteristics of the granular materials, which can transition to a solid-like pseudo-phase with application of a vacuum inside the pliable membrane. This type of gripper employs static friction from surface contact, capture of the workpiece by conformal interlocking, and vacuum suction when an airtight seal is achieved on some portion of the workpiece surface. A jamming gripper employs static friction from surface contact, capture of workpiece by interlocking, and vacuum suction to grip different workpieces of varying shape, weight and fragility in an open loop configuration without employing grasp planning, vision, or sensory feedback.

SUMMARY

A gripping device is described and includes a holder including a base and a conformable jamming element that has a conformable releasable surface-adhesive element secured onto its surface.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
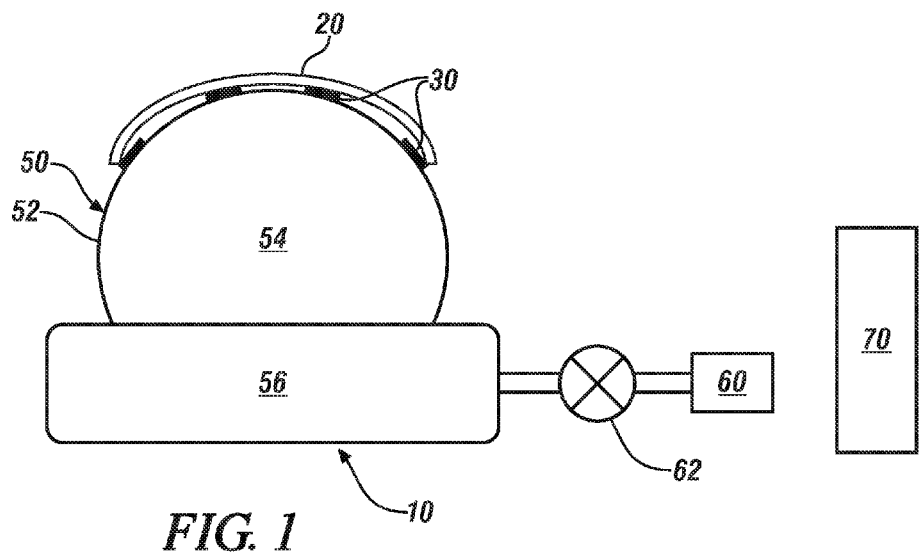
FIG. 1 schematically illustrates a two-dimensional side view of a holding device including a conformable jamming element having a conformable releasable surface-adhesive element secured onto a surface thereof, in accordance with the disclosure.

Referring now to the drawings, wherein the depictions are for the purpose of illustrating certain exemplary embodiments only and not for the purpose of limiting the same, FIG. 1 schematically illustrates a two-dimensional side view of a conformable holding device 10 including a conformable releasable surface-adhesive element 20 secured onto a surface of a jamming element 50 that may be employed on an end effector of a robotic arm to controllably grip or otherwise hold onto an workpiece or assist in holding onto a workpiece.

The jamming element 50 includes an air-impermeable pliable membrane 52 that sealably attaches to a base 56 and contains granular filling material 54. The base 56 attaches to an end-effector of a robotic arm in one embodiment. Suitable materials from which the membrane 52 may be fabricated include latex, vinyl, coated fabric and metal foil, among others. The membrane material is air-impermeable and is preferably resistant to tearing, e.g., by using multiple layers. Suitable material for the granular filling material 54 includes cracked corn, ground coffee and pulverized plastics among others. The base 56 includes a fluid conduit that connects to a controllable pressure source 60. The pressure source 60 generates negative pressure (vacuum) within the jamming element 50 in response to a first control signal to effect gripping of a workpiece, and permits vacuum release or generates positive pressure within the jamming element 50 in response to a second control signal to effect release of the workpiece. In one embodiment, the pressure source 60 fluidly couples to the jamming element 50 through a controllable shut-off valve 62, wherein the shut-off valve 62 is open while the pressure source 60 generates the vacuum within the jamming element 50 to effect gripping of the workpiece, is closed while the gripping is requested, and is re-opened to permit vacuum release within the jamming element 50 to effect release of the workpiece.

The conformable releasable surface-adhesive element 20 is preferably secured onto a surface of the jamming element 50 employing a plurality of re-usable attachment devices 30, e.g., hook and loop fasteners. Employing re-usable attachment devices 30 permits removal and replacement of the conformable releasable surface-adhesive element 20. A system controller 70 signally connects to the pressure source 60 to effect attachment and detachment to the workpiece. In certain embodiments, a single conformable releasable surface-adhesive element 20 is employed. Alternatively, multiple conformable releasable surface-adhesive elements 20 can be employed.

The jamming element 50 operates by contacting a workpiece and conforming to the shape of the workpiece. A vacuum is applied to vacuum-harden the filled membrane 52 to rigidly grip the workpiece, and the conformable releasable surface-adhesive element 20 adheres the surface of the workpiece. Subsequently, e.g., after work has been performed on the workpiece or it has been transported to another location, one or more bursts of positive pressure are applied to reverse the fluid-like-to-solid-like phase transition (jamming) causing the conformable releasable surface-adhesive element 20 to peel off the workpiece and return and thus reset the filled membrane 52 to a deformable, ready state.

The conformable releasable surface-adhesive element 20 includes surface adhesion concepts that are based upon feet of geckos. Feet of geckos have natural adhesive capability that allows the animal to adhere to a variety of surface types over a range of ambient conditions. The adhesive capability is provided by numerous hair-type extensions, called setae, on the feet of the gecko. Gecko setae include stalks having diameters in the range of 5 micrometers. At the distal end, each stalk branches out into nano-sized spatulae or pads, with roughly 100 to 1000 spatulae on each stalk, each of which is about 0.2 micrometers in length. Adhesion between the spatulae and a contacting surface is obtained due to van der Waals forces. The attractive forces between a single spatula and a surface can be on the order of 100 nano-Newtons (nN). The setae can be readily separated from the surface by the animal curling its toes off of the surface from the tips inward. This peeling action alters the angle of incidence between millions of individual spatulae and the surface, reducing the van der Waals forces and allowing the animal to move across the surface.

Figure 2:
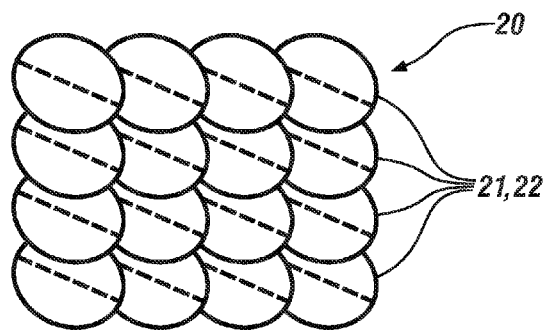
FIG. 2 schematically shows a bottom plan view of the conformable releasable surface-adhesive element, including a pliable substrate on which a plurality of flexible dry adhesive devices are fabricated, in accordance with the disclosure.
Figure 3:
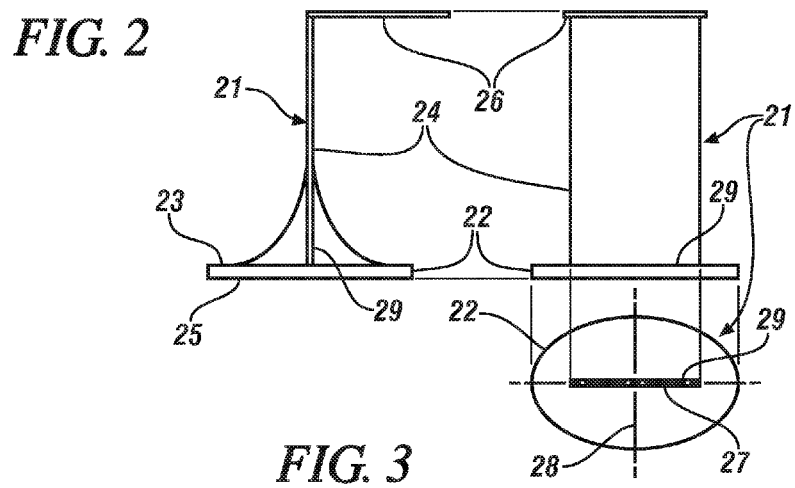
FIG. 3 schematically shows a side view, end view and bottom view of an embodiment of a single flexible dry adhesive device, in accordance with the disclosure.

FIGS. 2 and 3 schematically show an embodiment of a conformable releasable surface-adhesive element 20 that includes a plurality of dry adhesive devices 21. FIG. 2 shows a bottom view of one embodiment of the conformable releasable surface-adhesive element 20 including a plurality of the dry adhesive devices 21 arranged in an overlapping configuration. FIG. 3 shows top, side and bottom views of an embodiment of one of the dry adhesive devices 21. Each dry adhesive device 21 of the conformable releasable surface-adhesive element 20 includes a pad 22 that preferably attaches to a skeleton 26 using a flexible tether 24. Each tether 24 is preferably a planar-shaped sheet that is fabricated from synthetic fabric. Each pad 22 has a planar backing layer 23 that provides a substrate for mounting an adhesive surface 25. The planar back layer 23 is fabricated from an elastic material having a high in-plane stiffness, and is a woven synthetic fabric material in one embodiment. As employed herein, the term 'stiffness' refers to an ability to resist deflection in response to an applied force. The adhesive surface 25 is an elastomer that is impregnated or otherwise attached onto the backing layer 23, and the tether 24 attaches to the pad 22 on the backing layer 23 opposing the adhesive surface 25. The skeleton 26 provides a holding component for attaching the other end of the tether 24. Each pad 22 may be an oval-shaped element having a major axis 27 and a minor axis 28, and the tether 24 preferably attaches to the pad 22 along the major axis 27, forming a tether-pad connection 29. Alternatively, the conformable releasable surface-adhesive element 20 includes a plurality of the dry adhesive devices 21 arranged in an overlapping configuration employing pads 22 that attach directly to the skeleton 26, which attaches to the filled membrane 52. Alternatively, the conformable releasable surface-adhesive element 20 includes a plurality of the dry adhesive devices 21 arranged in an overlapping configuration employing pads 22 that attach directly to the filled membrane 52 without employing tethers 24 or skeleton 26. Large areas of interfacial contact can be designed through the combined properties of the soft elastic layer and the draping characteristics of a fabric layer. Furthermore, the elastic design provides a mechanism for repeated attachment and separation cycles without degradation in the load bearing capacity of the adhesive interface.

There is a specific designation of rotational freedom at continuous junctions, specifications of stiffness in loading direction with low flexural rigidity perpendicular to a surface of the elastic material, and the ability to achieve high capacity load support under both normal and shear loading directions with near-zero required pre-load, which refers to the amount of force that is required to establish an interface between the adhesive surface 25 and the backing layer 23 for supporting a given load. The pad 22 provides a dry adhesive structure that may be referred to as a T-pad. The pad 22 may support high loads under shear, normal, and multi-mode (i.e., peel) loadings while requiring minimal forces and energy for release or separation under specifically-designed release strategies.

The pad 22 is the basic structural element of the conformable releasable surface-adhesive element 20, which is connected to the tether 24. The tether 24 preferably maintains high stiffness in the pad 22 along the major axis 27 of loading through the tether-pad connection 29. The tether-pad connection 29 between the tether 24 and the pad 22 has pre-defined dimensions, orientation, and spatial location, according to particular needs, that can be modified to control the release strategy and provide tolerated balance of shear and normal loading.

This approach combines adhesion attributes of polymer materials and integrated mechanical designs through proper conservation of rotational freedom, low flexural modulus normal to the adhesive surface 25, and high stiffness in load bearing directions. A scaling relationship provides a framework for understanding the adhesive performance of the pad 22 over a range of size scales and geometries, and suggests that the adhesive capacity ($F_C$) of an interface is governed by three simple parameters, which are dependent on both the geometry and material properties of the interface. To design reversible adhesives which can adhere to various substrates, the interfacial interactions ($G_C$) rely upon non-specific van der Waals forces, rendering $G_C$ an ineffective control parameter. Therefore, to scale the adhesive capacity $F_C$ for adhesive materials the material system relies on the area on contact (A), system compliance (C) and attributes that increase and maximize a ratio of the area in relation to the system, i.e., maximize an A/C ratio. Thus, selected materials for the adhesive surface 25 are preferably pliable to increase true contact in conjunction with a stiffness in the backing layer 23 to achieve high loads. Pliable materials are able to create large-scale contact but have a high compliance when loaded, while stiff materials are unable to create extensive contact. In one embodiment, fabricating the pad 22 includes integrating a thin layer of an elastic elastomer into a surface of a fabric to form the adhesive surface 25 on the backing layer 23.

The tether 24 may be connected to the pad 22 to form the tether-pad connection 29 using any suitable method, such as conventional sewing, stitching, or gluing, which allows easy control of dimensional, orientational, and spatial location of the attachment. The tether-pad connection 29 preferably provides load sharing and load bearing capacity, and may be controlled through selection of a stitching pattern, width, and length. Appropriate stitching patterns include straight stitching, zigzag stitching, multi-zigzag stitch, satin stitching, honeycomb stitching, ladder stitch, double overlock stitch, and crisscross stitching.

For example, one embodiment of a tether-pad connection 29 is a straight-line stitching of the tether 24 to the pad 22 that is centered on the major axis 27 of the pad 22 and extends to a length that is approximately two-thirds of a chord length of the major axis 27 and perpendicular to and centered about the minor axis 28 of the pad 22. The tether-pad connection 29 preferably maintains rotational freedom while maintaining high stiffness in the direction of loading. The tether-pad connection 29 preferably maintains equal load sharing along its entire length. At a distance sufficiently far from the tether-pad connection 29, the tether 24 is integrated into the skeleton 26, which is a load bearing material that has high flexural rigidity and in-plane stiffness. The connection between the tether 24 and the skeleton 26 is preferably continuous to ensure equal load-sharing along its length. In one embodiment, one pad structure can act independently or in conjunction with an array of pads or units, which may be mounted with rotationally-free joints to a supporting substrate that can be rigid in one or more directions, for example. For certain applications, e.g., a large weight bearing shelf, multiple points for attaching the tether 24 to the pad 22 may also be employed.

Figure 4:
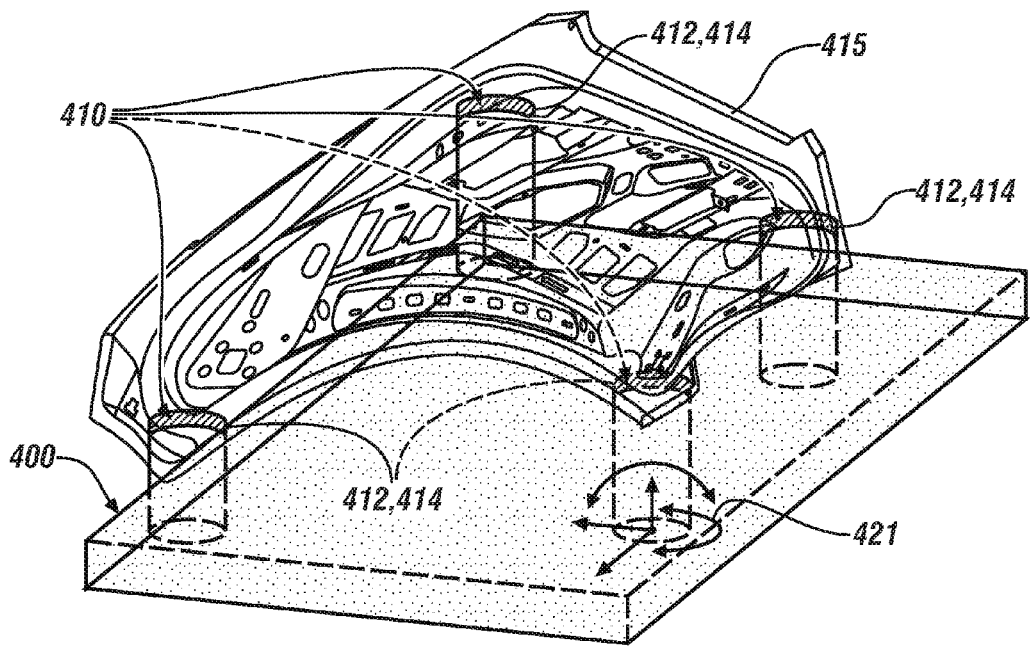
FIG. 4 schematically shows a three-dimensional partially translucent isometric view of a workpiece holder including a conformable jamming element having a conformable releasable surface-adhesive element secured onto a surface thereof and configured to conformally interface with a workpiece at a plurality of gripping locations with the workpiece secured on top of the holder, in accordance with the disclosure.

FIG. 4 schematically shows a three-dimensional isometric view of a workpiece holder 400 that may be in the form of a fixture, tooling or a robotic end-effector that has been configured to conformally interface with a workpiece 415 at a plurality of gripping locations. The holder 400 includes a plurality of holding devices 410 analogous to the holding device 10 described with reference to FIGS. 1 and 2. In one embodiment, the holder 400 includes a single one of the holding devices 410. As such, each holding device includes a conformable jamming element 412 having one or a plurality of conformable releasable surface-adhesive elements 414 secured onto a surface thereof and configured conformally interface with a workpiece when controlled by a controller. As shown the workpiece 415 rests on top of the holder 400 and the workpiece 415 is secured thereto by a holding force applied to the conformed surface of the holding devices 410. The holding devices 410 are depicted as orthogonal to a planar surface of the holder 400, but it is appreciated that the holding devices may be arranged in any suitable orientation with reference to the holder 400. Furthermore, as indicated by element 421, individual ones of the holding devices 410 may be moveable to different positions on the holder 400, including being configured for xy-plane translation on the surface of the holder 400, extension in a z-direction, or rotation about an x-axis, ay-axis, and/or a z-axis, i.e., pitch, yaw and/or roll rotations, thus having as many as six degrees of freedom of motion to accommodate and adapt to workpieces 415 having different geometries. The chosen degrees of freedom may be any combination of x,y,z translations and/or pitch/yaw/roll rotations.

Figure 5:
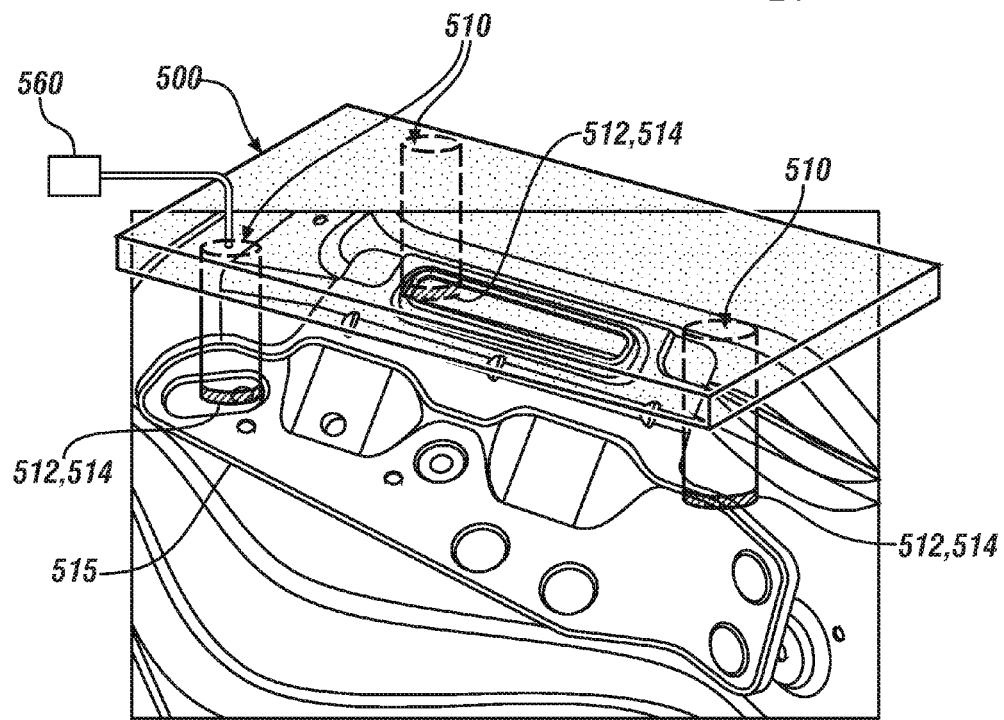
FIG. 5 schematically shows a three-dimensional partially translucent isometric view of a workpiece holder including a conformable jamming element having a conformable releasable surface-adhesive element secured onto a surface thereof and configured to conformally interface with a workpiece at a plurality of gripping locations with the workpiece secured below the holder, in accordance with the disclosure.

FIG. 5 schematically shows a three-dimensional isometric view of a workpiece holder 500 that may be in the form of a fixture, tooling or a robotic end-effector and is configured to conformally interface with a workpiece 515 at a plurality of gripping locations. The holder 500 includes a plurality of conformable holding devices 510 analogous to the holding device 10 described with reference to FIGS. 1 and 2. As such, each holding device 510 includes a conformable jamming element 512 having one or a plurality of conformable releasable surface-adhesive elements 514 secured onto a surface thereof and configured to conformally interface with the workpiece 515 when controlled by a controller. As shown the workpiece 515 suspends from and adheres to the holder 500 with the workpiece 515 secured thereto by holding force applied to the conformed surface of the holding devices 510. The holding devices 510 are depicted as orthogonal to a planar surface of the holder 500, but it is appreciated that the holding devices 510 may be arranged in any suitable orientation with reference to the holder 500.

In operation, an embodiment of the holder 500 including one or a plurality of conformable holding devices 510 including conformable jamming elements 512 and conformable releasable surface-adhesive elements 514 operates as follows. Initially each holding device 510 is static, i.e., no vacuum is applied. An end-effector urges the holding device 510 against a portion of the workpiece 515 by a force of a magnitude that is sufficient to conform the holding device 510 to the surface of the workpiece 515. A pressure source 560 is activated to generate negative pressure (vacuum) within the jamming element 512 to jam the particles to maintain the conformed shape and provide some holding force for external features. The conformable releasable surface-adhesive elements 514 generate a holding force. The holder 500 is moved by a robotic arm to a desired location to do work on the workpiece 515. After the work is completed, the pressure source 560 is deactivated to release the vacuum, allowing the conformed shape of the jamming element 512 to relax. The relaxation of the jamming element 512 causes edges of the conformable releasable surface-adhesive elements 514 to peel from and thus release the workpiece 515. The configuration enables use of any suitable workpiece grip orientation, including internal, flat and external grips while conforming to the workpiece shape and workpiece cavities. The configuration is readily reconfigurable to different workpiece geometries.

An embodiment of a holder described herein including one or a plurality of conformable releasable surface-adhesive elements provides a gripper element where the gripper may have one or more such elements to enable gripping a workpiece or supporting the workpiece while providing sufficient accessibility to enable welding. A workpiece holder including one or a plurality of conformable releasable surface-adhesive elements provides a gripper element wherein the gripper may have one or more such elements to enable gripping of a workpiece while providing sufficient accessibility to enable welding or other work to be performed on or with the workpiece. One or more of the holding devices can be repositioned or reconfigured to a different location to accommodate different workpieces having differing geometries. A workpiece holder including a releasable surface-adhesive element including a plurality of overlapping dry adhesive devices secured thereto provides a gripper element that is able to effect an external grip by folding around and conforming to a portion of a workpiece and through use of surface-adhesive force. A workpiece holder including a releasable surface-adhesive element including a plurality of overlapping dry adhesive devices secured thereto provides a gripper element that is able to effect an internal or flat grip to a portion of a workpiece through use of surface-adhesive force. The workpiece holder including a releasable surface-adhesive element provides a gripper element that is able to effect a combination of external, internal and/or flat grips to a portion of a workpiece through use of surface-adhesive force. The workpiece holder may be applied in any material handling situation, including but not limited to manufacturing and assembly processes, material handling and conveyancing, measurement, testing and the like.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A gripping device, comprising a holder including a base and a conformable jamming element having a conformable releasable surface-adhesive element secured onto a surface thereof; wherein the conformable releasable surface-adhesive element includes a plurality of overlapping dry adhesive devices; and wherein each overlapping dry adhesive device comprises a pad attached to a tether.

2. The gripping device of claim 1, wherein the pad comprises an adhesive surface mounted on a planar backing layer.

3. The gripping device of claim 2, wherein the planar backing layer comprises an elastic material having high in-plane stiffness.

4. The gripping device of claim 2, wherein the adhesive surface comprises an elastomer attached onto the planar backing layer.

5. The gripping device of claim 1, wherein the pad comprises an oval-shaped element having a major axis and a minor axis, wherein the tether is a planar sheet, and wherein the pad is attached to the tether along its major axis.

6. The gripping device of claim 5, wherein the pad attached to the tether along its major axis comprises the pad attached to the tether along a straight-line portion of the major axis of the pad and centered about the minor axis of the pad.

7. The gripping device of claim 1, wherein the conformable releasable surface-adhesive element secured onto a surface of the jamming element further comprises the conformable releasable surface-adhesive element secured onto the surface of the jamming element employing a plurality of re-usable attachment devices.

8. The gripping device of claim 1, wherein the conformable jamming element attached to the base includes a closed impermeable pliable membrane containing a granular filling material;
and further comprising the base including a fluid conduit that connects to a pressure source, wherein the pressure source generates a negative pressure in the jamming element in response to a first control signal.

9. The gripping device of claim 8, wherein the pressure source generates the negative pressure in the jamming element in response to the first control signal in conjunction with the conformable releasable surface-adhesive element gripping a portion of the workpiece when the holding device is urged against the portion of the workpiece.

10. A holding device for gripping a portion of a workpiece, comprising:
a holder including a base and a conformable jamming element having a conformable releasable surface-adhesive element including a plurality of overlapping dry adhesive devices on a surface thereof; wherein each overlapping dry adhesive device comprises a pad attached to a tether;
the conformable jamming element attached to the base and including a closed impermeable pliable membrane containing a granular filling material;
a controllable pressure device fluidly coupled to the conformable jamming element; and
a controller communicating with the controllable pressure device;
wherein the conformable releasable surface-adhesive element grips a portion of the workpiece when the holding device is urged against the portion of the workpiece.

11. The holding device of claim 10, wherein the conformable jamming element attached to the base includes a closed impermeable pliable membrane containing a granular filling material;
and further comprising the base including a fluid conduit that connects to a pressure source, wherein the pressure source generates a negative pressure in the jamming element in response to a first control signal.

12. The holding device of claim 10, wherein the pad comprises an adhesive surface mounted on a planar backing layer including an elastic material having high in-plane stiffness.

13. The holding device of claim 12, wherein the pad comprises an oval-shaped element having a major axis and a minor axis, wherein the tether is a planar sheet, and wherein the pad is attached to the tether along its major axis.

14. The holding device of claim 13, wherein the pad attached to the tether along its major axis comprises the pad attached to the tether along a straight-line portion of the major axis of the pad and centered about the minor axis of the pad.

15. A holder for gripping a workpiece, comprising:
a plurality of conformable holding devices, each holding device including a base and a conformable releasable surface-adhesive element including a plurality of overlapping dry adhesive devices secured onto a surface thereof, wherein a conformable jamming element attaches to its base and includes a closed impermeable pliable membrane containing a granular filling material, a controllable pressure device fluidly coupled to the conformable jamming elements; and
a controller communicating with the controllable pressure device;
wherein each of the plurality of overlapping dry adhesive devices comprises a pad attached to a tether that grip portions of the workpiece in response to commands from the controller to the controllable pressure device; and
wherein one of the conformable holding devices has freedom of motion on the holder adaptable to the workpiece.

* * * * *